United States Patent [19]

Schils

[11] Patent Number: 4,616,803
[45] Date of Patent: Oct. 14, 1986

[54] DECLUTCHABLE VALVE OVERRIDE

[75] Inventor: Petrus J. R. Schils, Breda, Netherlands

[73] Assignee: Keystone International, Inc., Houston, Tex.

[21] Appl. No.: 525,655

[22] Filed: Aug. 23, 1983

[51] Int. Cl.⁴ .............................................. F16K 31/14
[52] U.S. Cl. ........................................ 251/14; 251/62;
 251/288; 251/285; 251/291; 251/249.5; 74/425;
 74/405; 74/625
[58] Field of Search ................... 251/14, 12, 130, 59,
 251/66, 249.5, 286, 291, 288, 285; 74/405, 625,
 425, 424.8

[56] References Cited

U.S. PATENT DOCUMENTS

| 1,142,723 | 6/1915 | Merritt | 251/286 |
| 1,529,578 | 3/1925 | Dorsey | 74/405 |
| 1,764,936 | 6/1930 | Dean | 251/130 X |
| 1,990,090 | 2/1935 | Packard | 251/130 X |
| 2,352,140 | 6/1944 | Trott | 251/14 X |
| 2,390,882 | 12/1945 | Hopkins | 251/14 X |
| 2,704,947 | 3/1955 | Hopkins | 251/14 X |
| 2,771,169 | 11/1956 | Wahlstrom | 74/405 X |
| 3,801,062 | 4/1974 | Arn et al. | 251/14 |
| 3,842,690 | 10/1974 | Gulick | 251/14 X |
| 4,412,670 | 11/1983 | Card et al. | 251/14 |
| 4,429,592 | 2/1984 | Stevenson | 251/14 X |
| 4,533,114 | 8/1985 | Cory et al. | 251/249.5 X |

FOREIGN PATENT DOCUMENTS

| 587497 | 11/1959 | Canada | 251/249.5 |
| 620726 | 5/1961 | Canada | 251/130 |
| 671174 | 1/1939 | Fed. Rep. of Germany | 74/625 |
| 1181512 | 11/1969 | Fed. Rep. of Germany | 251/14 |
| 19424 | 1/1915 | France | 74/405 |
| 613049 | 11/1960 | Italy | 251/130 |

Primary Examiner—Samuel Scott
Assistant Examiner—Carl D. Price
Attorney, Agent, or Firm—Browning, Bushman, Zamecki & Anderson

[57] ABSTRACT

The invention comprises an improved override and an interrelated valve system. A main valve has an actuator, the actuator in turn having a control for communicating a control signal to the actuator for selectively causing the actuator to place the main valve in its open or closed position. The override is associated with the main valve and selectively shiftable between an engaged mode in which the override is operatively connected with the main valve for moving the main valve between its open and closed positions, and a disengaged mode in which the operative connection between the override and the main valve is interrupted, whereby the main valve may move independently of the override. A shut-off functionally interconnects the override and the actuator control and is operative, upon shifting of the override to its engaged mode, to block the control signal from the actuator. The override includes a housing, a driven gear in the housing connected to the valve element of the main valve, a clutch shaft mounted in the housing for rotation about its own axis, a drive shaft rotatably mounted in the clutch shaft, with the axis of the drive shaft parallel to but eccentrically spaced from the axis of the clutch shaft, and a drive gear generally opposed to the driven gear and coaxially carried by the drive shaft for rotation therewith. By rotation of the eccentric clutch shaft, the two gears may be engaged and disengaged.

12 Claims, 5 Drawing Figures

DECLUTCHABLE VALVE OVERRIDE

BACKGROUND OF THE INVENTION

The present invention pertains to override systems for valves. A typical example of the type of valve assembly to which the present invention may be applied in a rotary valve assembly, such as a butterfly valve, which includes a valve body or housing defining a flowway, a valve element rotatably mounted in the flowway for movement between a closed position, blocking the flowway, and an open position, permitting passage therethrough, and a valve stem connected to the valve element and extending outwardly therefrom. Typically, an actuator is connected to the valve element for rotating it along with the attached valve element to open and close the valve. The invention can also be applied to other types of valves, such as gate valves or other reciprocating type valves, particularly if the movement of the valve element and attached valve stem, although ultimately reciprocatory in nature, may be effected by a rotary output member of the valve actuator, e.g. through a screw and nut type connection.

Where the valve actuator is an automatic type, such as a pneumatic, hydraulic or electric actuator, it is conventional to provide manual override means which may be used to manually open or close the valve, as when the actuator fails, is in process of being repaired or serviced, etc. Prior override systems have been fraught with a number of problems.

Some of these problems stem from the interconnection of the actuator with the remainder of the system. In such systems, the primary or automatic actuator was not adequately deactivated during operation of the manual override. For example, with actuators of the pneumatic or hydraulic type, it was typically necessary, in operating the manual override, not only to provide enough force to operate the valve per se, but in addition, to overcome the resistance of pressurized fluid trapped within a pneumatic or hydraulic cylinder of the actuator.

In other cases, the use of the override would be occasioned by circumstances also resulting in loss of power to the actuator. For example, if the actuator were pneumatic, power to the actuator might be temporarily lost during repair work on the compressor for the pneumatic fluid. Sudden return of power at the time of completion of such repair would cause sudden and/or rapid movements of the actuator and valve. This in turn could result in injury to an operator who might be attempting to use the override at the time the air pressure or power returned.

Still other problems with typical prior art valve/actuator/override systems are results of the nature and structure of the override mechanisms themselves. Such conventional override mechanisms typically have gear systems in which the gears are constantly engaged, and in which the override is rendered operative or inoperative by engaging and disengaging connections between two rotary shafts, one on the override, and the other on the valve element or actuator. These conventional override mechanisms were large, e.g. due to the need for room to move keys in and out of engagement with the various shafts. Their large size not only made them difficult to mount and operate, but also heavy. The size and weight problems were even further increased in that, due to the nature of the structure and operation of these devices, if the parts were not made relatively large and heavy, they would fail in use.

SUMMARY OF THE INVENTION

A system according to the present invention comprises a main valve assembly, having the usual open and closed positions, and a main valve actuator operatively connected to the main valve assembly for moving it between its open and closed positions. An actuator control means communicates a control signal (e.g. pneumatic, hydraulic or electrical) to the actuator for selectively causing the actuator to place the main valve assembly in its open or closed position. The override means is associated with the main valve assembly and selectively shiftable between an engaged mode, in which it is operatively connected with the main valve assembly, and a disengaged mode, in which the aforementioned operative connection is interrupted and the main valve may more independently of the override.

An important feature of the invention is that this system is equipped with a shut-off means which functionally interconnects the override means and the actuator control means. The shut-off means is operative, upon shifting of the override means to its engaged mode, to block the control signal from the actuator.

For example, where the actuator is of a pneumatic or hydraulic type, the shut-off means may comprise a shut-off valve interconnecting the actuator and a source of pneumatic or hydraulic fluid. Such a shut-off valve has a flow position, communicating the source of control fluid to the actuator, and a shut-off position, blocking the source of control fluid from the actuator. Preferably, in the shut-off position, the shutoff valve is further operative to exhaust control fluid from the actuator.

Thus, whenever the override means is engaged, the shut-off valve will automatically be placed in its shut-off position. This not only blocks control fluid from entering the actuator, but also exhausts whatever pressurized fluid may be in the actuator at that time. This makes it much easier and safer for the operator to use the override. He will not be working against pressurized fluid in the actuator. Furthermore, other repair activities, e.g. on the compressor for the pneumatic fluid of the actuator, will not cause any sudden or rapid movements of the actuator and/or main valve whereby the operator could be injured while using the override.

The override is further improved in that, rather than shifting between its engaged and disengaged modes by virtue of connections and disconnections between various shafts, respective rotary drive and driven elements, such as gears, are operatively engaged and disengaged. More specifically, the rotary driven element may be a worm wheel connected to the valve stem of the main valve assembly. The rotary drive element may be a worm indirectly connected to the valve body. A clutch means is provided for moving the worm toward and away from the worm wheel so that the gears are meshed in the engaged mode of the override and separated in the disengaged mode. Even more specifically, the override may include a housing, in which a clutch shaft is mounted for rotation about its own axis. The worm gear is carried on a drive shaft which is rotatably mounted in the clutch shaft, with its axis parallel to but eccentrically spaced from that of the clutch shaft. Thus, as the clutch shaft is rotated about its own axis, the drive shaft and the worm gear carried thereby may be moved into and out of operative engagement with the worm wheel.

These improvements result in a number of distinct advantages. Not only can the override be made much smaller and lighter weight than typical prior art overrides, but it may also be mounted in a more convenient manner. In particular, the override can be "sandwiched" between the actuator and the valve, with the valve element, worm wheel, and rotary output member of the actuator all coaxially connected. Indeed, it is particularly easy to adapt existing valve/actuator systems for incorporation of the improved override according to the invention in that the valve element can simply be connected to the worm wheel in a manner more or less identical to that in which it would otherwise be connected to the actuator output member. Then, the other end of the worm wheel can be adapted for connection to the actuator output member in a manner similar to that of the original valve stem.

Accordingly, it is a principal object of the present invention to provide an improved flow control apparatus, including a main valve assembly and related parts.

Another object of the present invention is to provide such a system wherein engagement of a manual override automatically effectively deactivates the valve actuator.

Still another object of the present invention is to provide an improved override mechanism for a valve.

A further object of the present invention is to provide such an improved override which is engaged and disengaged by relative movement of respective rotary drive and driven gears.

Yet another object of the present invention is to provide such an improved override in which the relative movements of the rotary drive and driven elements are effected by an eccentric mechanism.

Still other objects, features and advantages of the present invention will be made apparent by the following detailed description, the drawings and the claims.

DETAILED DESCRIPTION

Figure 1:
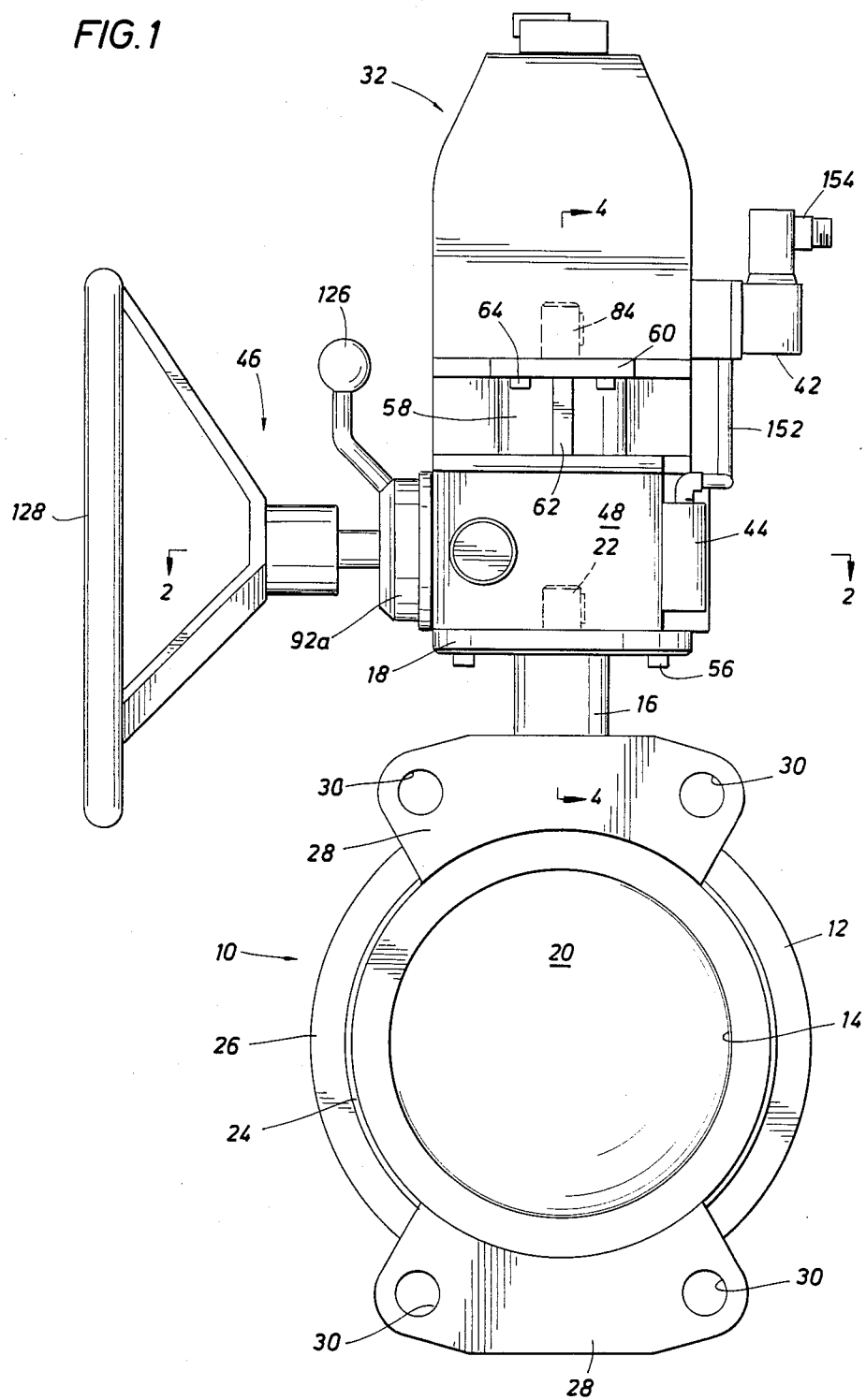
FIG. 1 is a front elevational view of a flow control system according to the present invention.

Referring to the drawings, there is shown an exemplary system according to the present invention in which the main valve assembly 10 comprises a valve body 12 defining a fluid flowway 14. Valve body 12 has an integral tubular neck 16 extending upwardly therefrom, with an annular mounting flange 18 extending radially outwardly from the upper end of neck 16. The main valve assembly 10 further comprises a disk type valve element 20 rotatably mounted in flowway 14 in a manner well known in the art. More specifically, valve element 20 is mounted for joint rotation with a shaft or valve stem, which extends upwardly through body neck 16, the upper end of the valve stem being shown at 22. Valve element 20 is shown in its closed position, wherein it blocks flowway 14. The valve element is movable, specifically by ninety degrees rotation, to an open position in which it lies generally parallel to the centerline of flowway 14. Flowway 14 is lined with an annular elastomeric seat 24 which is retained in valve body 12 by a pair of annular plates, one of which is shown at 26. Mounting flange plates 28 secured to valve body 12 define bolt holes 30 whereby valve 10 may be connected between flange fittings in a pipeline or the like.

The system further includes a pneumatic actuator 32 for main valve assembly 10. Actuator 32 may be of a well known type in which the actuator housing incorporates a pneumatic cylinder in which reciprocates a piston 34 (see FIG. 5). Well known means, such as a system of gears or other linkage, is provided for translating the reciprocating movement of piston 34 to rotational movement of the actuator's rotary output member 36 (see FIG. 4).

In the absence of the override mechanism, to be described more fully hereinbelow, actuator 32 might be directly operatively connected to main valve assembly 10. Specifically, output member 36 has a central bore 38 into which the protruding upper end 22 of the valve stem could be emplaced and connected for joint rotation by a suitable key. The exemplary embodiment of override mechanism illustrated in this application may easily be interconnected between valve 10 and actuator 32, in the manner described hereinbelow, whereby actuator 32 imparts rotary movement to valve stem 22 by means of intervening elements of the override mechanism. However, in alternative embodiments, the actuator might remain directly connected to the main valve assembly, with the override mechanism being positioned above the actuator and connected to the valve stem by means of the rotary output element 36. Still other variations on the manner of interconnecting the three basic parts of the system will suggest themselves to those of skill in the art.

Referring again to FIGS. 1 and 5, a control means is provided for communicating a source 40 of compressed air with the pneumatic cylinder 33 of actuator 32. The air serves not only as a motive force, but also as a "control signal" causing the actuator 32 to place valve 10 in its open or closed position as desired. The control means comprises a solenoid type control valve 42. Valve 42 may be operated in any well known manner to alternately direct the high pressure pneumatic fluid from source 40 to one side or the other of actuator piston 34. A shut-off valve 44, carried on and associated with the override mechanism 46, is interposed between fluid source 40 and control valve 42. The functions of valves 42 and 44 will be more fully described below.

Figure 2:
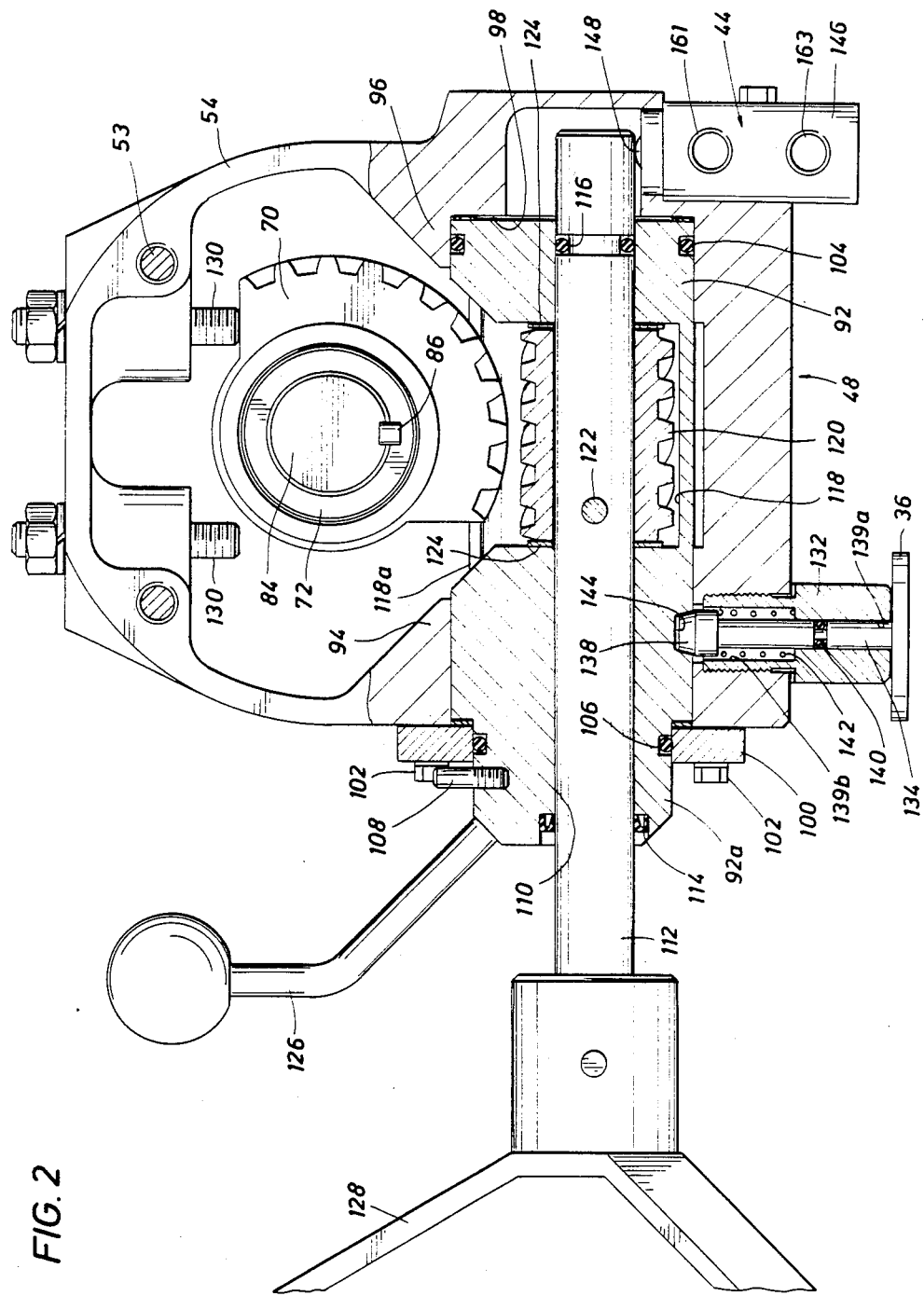
FIG. 2 is a transverse cross-sectional view through the override taken generally along the line 2—2 in FIG. 1, and showing the override in disengaged mode.
Figures 4, 5:
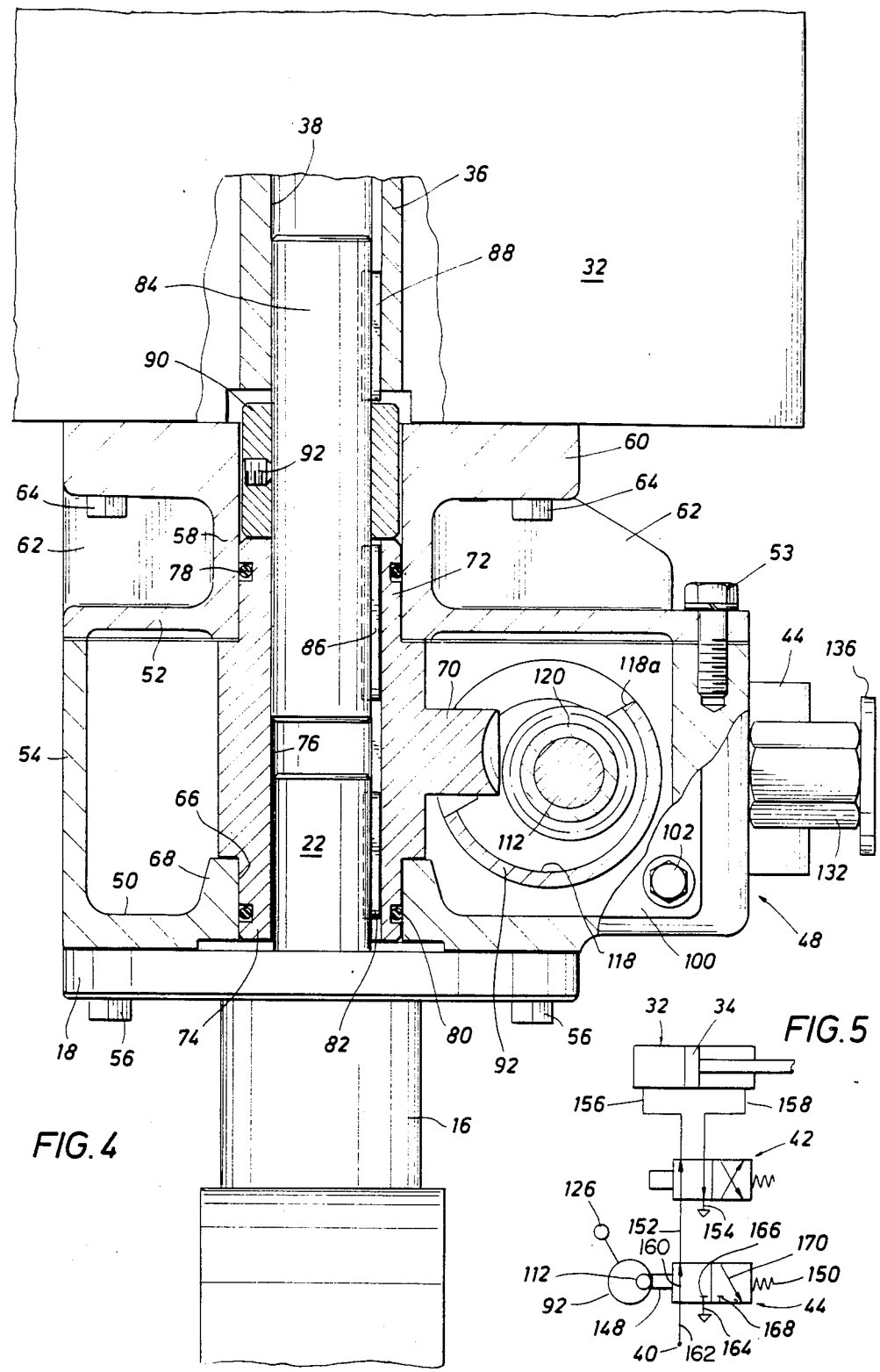
FIG. 4 is a longitudinal sectional view through the override taken generally along the line 4—4 in FIG. 1.
FIG. 5 is a schematic of the system.

Referring now jointly to FIGS. 1, 2 and 4, the override mechanism 46 comprises a housing 48 on or in which the various other parts of the override mechanism are mounted. Housing 48 includes lower plate 50, with integral side wall 54, and upper plate 52 secured to wall 54 by screws 53. Bottom plate 50 rests on mounting flange 18 of valve body 12, and may be removably secured thereto in any suitable manner, e.g. by screws 56. Housing 48 further includes a tubular neck 58 integral with and extending upwardly from upper plate 52 and terminating in a radially outwardly extending mounting flange 60. Flange 60, neck 58, and upper plate 52 are further interconnected by gussets 62. Actuator 32 rests on flange 60 and may be secured thereto in any suitable manner, e.g. by screws 64. Bottom plate 50 has an aperture 66 therein surrounded by an inwardly extending annular rim 68 which is aligned with and of equal inner diameter to neck 58.

Disposed within housing 48 is a rotary driven gear element in the form of a quadrant type worm wheel 70. Worm wheel 70 has integral upper and lower trunnion portions 72 and 74 centered on its axis of rotation, and an axial bore 76 extending completely through worm wheel 70 and its trunnion portions 72 and 74. Trunnion portions 72 and 74 are rotatably mounted in housing neck 58 and housing rim 68 respectively, and sealed with respect thereto by respective O-rings 78 and 80.

Upper end 22 of the valve stem of main valve assembly 10 is received within the lower part of bore 76 and connected for joint rotation with worm wheel 70 by a key 82. Worm wheel 70 is further keyed to a rod 84 disposed in the upper portion of bore 76 by a key 86. Rod 84 extends upwardly through housing neck 58 and into the bore 38 of output member 36 of actuator 32. Rod 84 is keyed to element 36 by a key 88 for joint rotation.

It can be seen that the manner of connecting rod 84 to element 36 is analogous to the manner of connecting valve stem 22 to worm wheel 70. Thus, if main valve 10 and its actuator 32 represent existing devices, it can be seen that little or no modification thereof is necessary to interconnect worm wheel 70 between valve stem 22 and actuator output member 36, utilizing the means otherwise used to connect element 36 and valve stem 22 directly to each other. A stop ring 90 surrounds rod 84 and is fixed with respect thereto by a set screw 92. Ring 90 is disposed within housing neck 58, and rests on the upper end of trunnion portion 72 of worm wheel 70. Keys 86 and 88 oppose the lower and upper ends respectively of ring 90. Thus, ring 90 serves to retain rod 84 in proper lengthwise positions.

Figure 3:
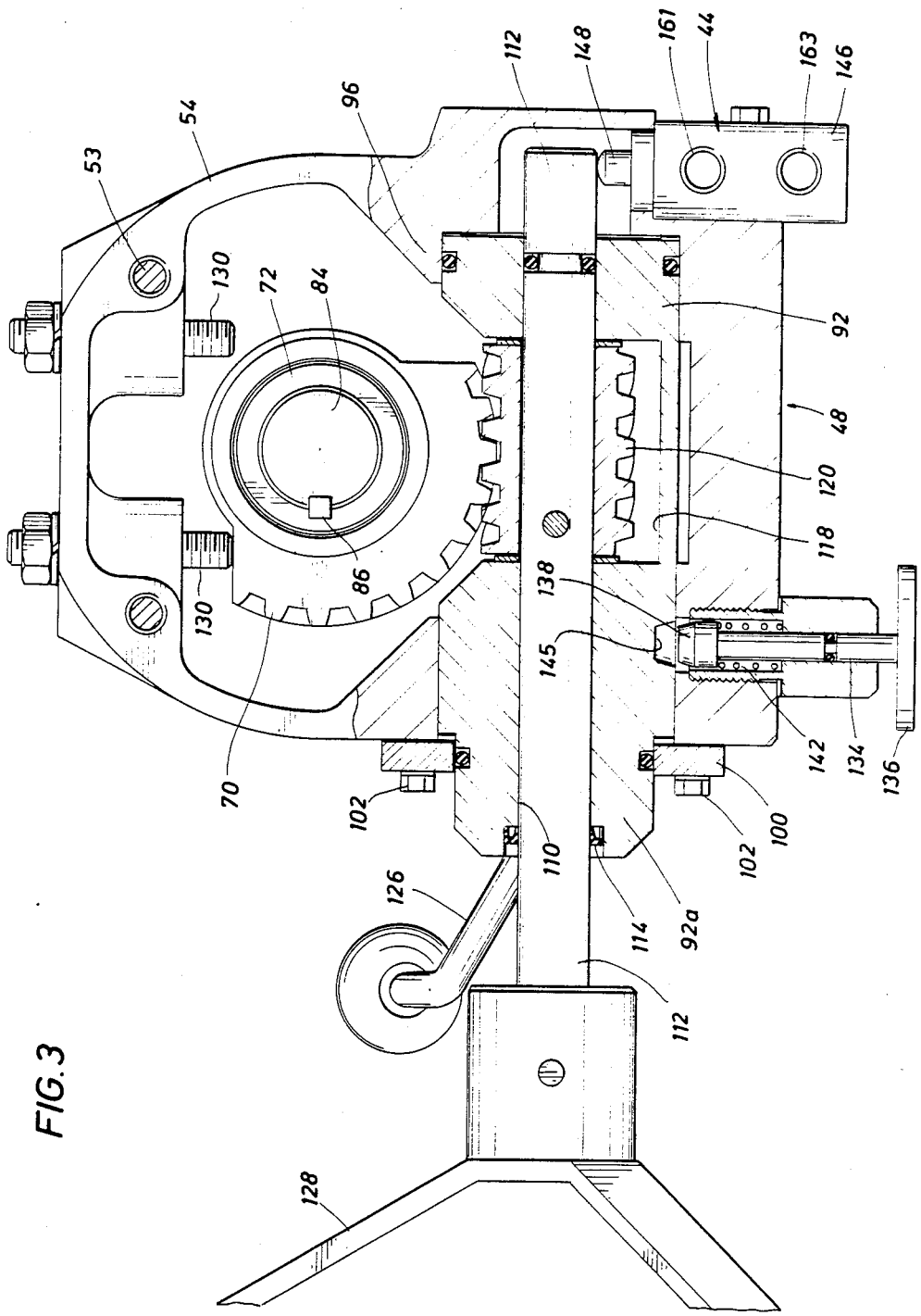
FIG. 3 is a view similar to that of FIG. 2 showing the override in engaged mode.

The override mechanism further includes a clutch shaft 92 which is mounted in housing 48 for rotation about its own axis. As best shown in FIGS. 2 and 3, housing 48 has its internal surfaces formed so as to define integral bushing formations 94 and 96 which closely surround the major, relatively large diameter portion of shaft 92, which is located within housing 48. One end of clutch shaft 92 is disposed within housing 48, its end abutting a shoulder 98 formed on bushing formation 96. At its other end, shaft 92 has a reduced diameter extension 92a, which protrudes outwardly through housing 48. A retainer 100 is affixed to housing 48 by screws 102 in surrounding relation to the bore in the housing through which shaft extension 92a protrudes. The inner diameter of ring 100 is sized to closely surround shaft extension 92a, and opposes the shoulder formed between extension 92a and the remainder of shaft 92 to retain shaft 92 in proper position in housing 48.

Shaft 92 has its opposite end portions sealed with respect to housing 48 and retainer 100 (which effectively forms a portion of the housing) by respective O-rings 104 and 106. A dowel pin 108 is threaded into shaft extension 92a outwardly of ring 100 so as to project radially from the shaft extension. Pin 108 is abuttable with similar pins affixed on housing 48 to serve as stops for limiting movement of shaft 92.

Clutch shaft 92 has a bore 110 extending longitudinally therethrough. Bore 110 is parallel to but eccentrically spaced from the centerline or axis of shaft 92. Within bore 110 there is rotatably mounted a drive shaft 112. Drive shaft 112 is sealed with respect to clutch shaft 92 by seals 114 and 116.

Clutch shaft 92 further has a hollowed out area 118 communicating with bore 110. Hollow 118 receives a worm gear 120 fixedly mounted on drive shaft 112 by pin 122. Pin 122 fixes worm 120 both angularly and longitudinally with respect to drive shaft 112. Washers 124, which surround shaft 112, fit between the ends of worm 120 and the respective opposed ends of hollow 118. Thus, worm 120 fixes shaft 112 longitudinally within shaft 92. Hollow 118 has a mouth 118a opening radially outwardly through shaft 92 so as to allow the gear teeth of worm wheel 70 to project into hollow 118 for potential engagement with the generally opposed worm 120.

A clutch handle 126 is integrally adjoined to clutch shaft extension 92a whereby clutch shaft 92 may be rotated about its own axis. A drive handle 128 is similarly integrally adjoined to the adjacent end of drive shaft 112, which extends outwardly from shaft extension 92 and housing 48, whereby the drive shaft 112 may be rotated about its axis along with the worm 120 carried thereby.

Clutch shaft 92 serves as an eccentric. Thus, by rotating clutch shaft 92, via handle 126, worm 120 can be moved toward and away from worm wheel 70. More specifically, the override can be shifted between a disengaged mode, shown in FIG. 2, wherein the teeth of worm 120 and worm wheel 70 are separated, and an engaged mode, shown in FIG. 3, wherein the gear teeth are meshed. With the gears meshed in engaged mode, as shown in FIG. 3, drive handle 128 may be rotated, thereby rotating drive shaft 112 and the attached worm 120 about their own axis, driving worm wheel 70, and thereby moving the attached valve stem 22 and valve element 20 to open or close the main valve assembly 10. A pair of bolts 130 are installed in housing 48, and their ends project into the interior of the housing whereby they may engage respective opposite edges of the quadrant of worm wheel 70 to stop movement thereof when the main valve assembly 10 is in its full open or full closed position.

A latch or detent mechanism is provided for retaining clutch shaft 92 in its engaged or disengaged mode, and thereby preventing inadvertent engagement or disengagement of the override mechanism. More specifically, a detent holder 132 has a small diameter threaded end portion which is threaded into housing 48 and a larger diameter portion projecting outwardly from the housing. Holder 132 is oriented generally radially with respect to shaft 92. Holder 132 has a central through bore along its centerline in which a detent element 134 is reciprocably mounted. Detent element 134 has a knob 136 affixed to its outer end, outwardly of holder 132, and a head 138 affixed to its inner end.

The central bore of holder 132 has a small diameter outer portion, which closely surrounds element 134 to guide it in its reciprocating movements, and is sealed with respect thereto by an O-ring 140. The inner portion 139b of the holder bore is enlarged to accommodate detent head 138 as well as a helical compression spring 142. Spring 142 bears on head 138 and on the shoulder formed between the large and small diameter portions 139a, 139b of the holder bore to bias the detent element inwardly toward shaft 92.

When shaft 92 is in its full disengaged position, as shown in FIG. 2, a recess 144 in the outer diameter thereof is aligned with, and receives, detent head 138. To engage the override, the operator pulls outwardly on knob 136 and begins to rotate clutch handle 126. As non-recessed portions of the outer diameter of shaft 92 are thus brought into alignment with detent head 138, they will continue to hold the detent in its outer position, and knob 136 can be released. When shaft 92 reaches full engaged position, detent head 138 will automatically snap into a second recess 145. The procedure is generally reversed to return the apparatus to its disengaged mode.

The override mechanism is associated with shut-off valve 44 in such a way that, when the override mechanism is engaged, the actuator 32 will be effectively deactivated. Referring now to FIG. 5 along with the other figures, shut-off valve 44, which may be a well known type of spool valve, is a two-way valve having a reciprocating valve element. The housing 146 of valve 44 is mounted in override housing 48 such that a projection 148 of the valve element, which extends through one end of valve housing 146, projects inwardly into the interior of override housing 48. The end of drive shaft 112 opposite handle 128 extends through the adjacent end of clutch shaft 92 into a small pocket in valve housing 48 wherein it is generally opposed to projection 148 of the shut-off valve element. The valve element is spring biased inwardly, as diagrammatically indicated at 150 in FIG. 5, so that projection 148 constantly engages the opposed end portion of drive shaft 112. By comparing FIGS. 2 and 3, it can be seen that, when the override is in its disengaged mode, as shown in FIG. 2, wherein drive shaft 112 and worm 120 have been moved away from worm wheel 70, drive shaft 112 forces projection 148 and its attached valve element outwardly against the bias of spring 150. When the override mechanism is shifted to its engaged mode, as shown in FIG. 3, drive shaft 112 moves toward worm wheel 70 and away from projection 148, allowing the latter to be moved inwardly by spring 150.

Still referring to FIG. 5, control valve 42 is a four-way solenoid valve. Valve 42 has associated therewith an inlet line 152 whereby it is connected to shut-off valve 44, and an outlet or exhaust line 154. Valve 42 also has a pair of variable inlet-outlet lines 156 and 158 communicating with actuator cylinder 33 on opposite sides of the drive piston 34. Lines 156 and 158, and thus the opposite sides of piston 34, can be alternately connected, one to the inlet line 152 and the other to the outlet line 154, depending upon whether the valve 42 is shifted to the right or the left as viewed in FIG. 5, in a manner well known in the art.

FIG. 5 shows valve 44 in its flow position corresponding to that of FIG. 2, i.e. the position assumed by the valve when the override is disengaged. In that position, a throughway 160 in the valve element is positioned in communication with an inlet line 162 from the pneumatic air source 40 and also with inlet line 152 to control valve 42. An exhaust line 164 associated with valve 44 is blocked as indicated at 166. (Two of the ports of the valve housing 146, which are connected to two of the three lines 162, 164 or 152 are shown at 161 and 163 in FIG. 2.)

If handle 26 is operated to move drive shaft 112 away from projection 148, spring 150 will shift the valve element to the left, as viewed in FIG. 5, i.e. from the flow position shown to a shut-off position corresponding to that illustrated in FIG. 3. In the shut-off position, air supply line 162 will be blocked by formation 168. At the same time, a throughbore 170 will be communicated with both exhaust line 164 and inlet line 152 for the control valve 42. Thus, whichever of lines 156 and 158 is in communication with inlet line 152 at the time valve 44 is shifted to its shut-off position will, through valves 42 and 44, be communicated to exhaust line 164, and the currently pressurized side of the piston and cylinder assembly 33, 34 will be vented.

Accordingly, shut-off valve 44, as associated with the override mechanism, serves two very important functions: it completely blocks the pneumatic air supply from communication with the valve actuator, so that if there is a sudden return of pressure, there will be no rapid or sudden movements of the actuator and main valve assembly; furthermore, the side of piston 34 exposed to high pressure pneumatic fluid at the time the override is engaged is automatically vented, so that the operator can easily manually operate the valve, via handle 128, without trying to overcome the force of pressurized fluid within actuator 32. Indeed, when valve 44 is in its shut off position, both sides of piston 34 are vented, one throgh line 154, and the other through line 164.

Another safety feature built into the system is the fact that the type of gearing used in the override is of the worm type. While the worm wheel can be driven by the worm, it cannot drive thw worm. Thus, if due to some malfunction of one of the valves 42 or 44, or for any other reason, air pressure should suddenly return to actuator 32 while the operator is using handle 128, that handle cannot be suddenly or rapidly rotated so as to injure the operator.

When the override is returned to its disengaged position, drive shaft 112 will force valve 44 back to its flow position permitting intercommunication between the pneumatic air supply and the control valve 42 for the actuator 32.

The foregoing represents only one preferred embodiment of the invention, and any number of modifications may suggest themselves to those of skill in the art. For example, if the actuator were electrical, rather than pneumatic or hydraulic, the eccentric arrangements of shafts 112 and 92 could nevertheless be used to operate a switch, as opposed to a shut-off valve, for deactivating the actuator. Furthermore, such switch, while "functionally interconnected with the control means" may not be physically connected; e.g. it may operate by sonar, radio waves, etc. As previously mentioned, the principles of the invention can be applied to systems in which the main valve assembly is of a reciprocating, rather than a rotary type. Also, while it is believed to be particularly advantageous, in at least some instances, to mount the relatively small override apparatus of the invention between the main valve assembly and its actuator as illustrated herein, other variations are possible, e.g. in which the override would be located above the actuator. Accordingly, it is intended that the scope of the present invention be limited only by the claims which follow.

What is claimed is:

1. Flow control apparatus comprising:
a main valve assembly having an open position and a closed position and comprising a valve body defining a flowway therethrough and a valve element mounted in said flowway for movement between said open and closed positions;
a fluid operated main valve actuator operatively connected to said main valve assembly for moving said main valve assembly between said open and closed positions;
actuator control means for communicating a source of pressurized control fluid to said actuator for selectively causing said actuator to place said main valve assembly in said open or closed position;

override means associated with said main valve assembly and selectively shiftable between an engaged mode, in which said override means is operatively connected with said main valve assembly for moving said main valve assembly between said open and closed positions, and a disengaged mode, in which the operative connection between said override means and said main valve assembly is interrupted whereby said main valve assembly may move independently of said override means, said override means comprising
- a first rotary element having an axis and being connected to said valve element,
- a second rotary element having an axis and being rotatably connected to said valve body,
- clutch means for moving one of said rotary elements laterally with respect to the axis of said one rotary element toward and away from the other of said rotary elements between said engaged mode and said disengaged mode,
- and drive means operatively connected to said second rotary element for rotating said second rotary element about an axis of said second rotary element;
- and shut-off means functionally interconnected with said override means and fluidly connected to said actuator control means said shut-off means comprising a shut-off valve interconnecting said actuator and said source of control fluid, said shut-off valve having a flow position, associated with said disengaged mode, for communicating said source of control fluid to said actuator, and a shut-off position, associated with said engaged mode, for blocking said source of control fluid to said actuator and simultaneously exhausting said control fluid from said actuator.

2. The apparatus of claim 1 wherein:
said first rotary element is a first gear element, and said second rotary element is a second gear element.

3. The apparatus of claim 2 wherein:
said first gear element is a worm wheel;
said second gear element is a worm gear;
said drive means comprises a rotary drive shaft coaxially fixed to said worm gear;
and said clutch means is operative to move said drive shaft laterally with respect to the longitudinal axis of said drive shaft and said worm gear.

4. The apparatus of claim 3 wherein:
said override means further comprises a housing fixed with respect to said valve body;
said clutch means comprises a clutch shaft having an axis, said clutch shaft being mounted in said housing for rotation about said axis of said clutch shaft;
and said drive shaft is rotatably mounted in said clutch shaft, with the longitudinal axis of said drive shaft parallel to but eccentrically spaced from the axis of said clutch shaft.

5. The apparatus of claim 4 wherein said drive means further comprises a drive handle fixedly connected to said drive shaft for rotating said drive shaft, and said clutch means further comprises a clutch handle fixedly connected to said clutch shaft for rotating said clutch shaft.

6. The apparatus of claim 4 wherein said override means further comprises detent means cooperative between said housing and said clutch shaft for selectively retaining said clutch shaft in said disengaged or engaged mode.

7. The apparatus of claim 6 wherein said detent means is resiliently biased for automatic engagement upon rotation of said clutch shaft to effect said modes of said override means.

8. The apparatus of claim 4 wherein said shut-off valve has a reciprocating valve element with an exposed portion generally aligned with and engagable by said drive shaft for operation by movement of said drive shaft between said engaged and disengaged modes.

9. The apparatus of claim 4 wherein:
said main valve assembly is a rotary type valve;
said valve element is rotatably mounted in said flowway;
and said main valve assembly further comprises a valve stem connected to said valve element, said valve stem extending outwardly from said valve element for joint rotation with said valve element 10. The apparatus of claim 9 wherein:
said override means is disposed between said main valve assembly and said actuator;
said apparatus further comprises means releasably coaxially connecting said worm wheel to said valve element;
said actuator has a rotary output member, and said apparatus further comprises means releasably coaxially connecting said output member and said worm wheel; and
the means connecting said valve element to said worm wheel is of the same type as the means connecting said worm wheel to said rotary output member of said actuator.

11. The apparatus of claim 4 wherein said clutch shaft has axially spaced apart bearing portions so mounted in said housing, and a cutaway portion disposed axially between said bearing portions, receiving said worm, and opening radially outwardly through said clutch shaft, thereby exposing said worm for engagement with said worm wheel.

12. The apparatus of claim 1 wherein:
said actuator comprises a piston and cylinder assembly;
said actuator control means comprises a four-way control valve communicatively connected between said actuator and said shut-off valve for controlling flow of said control fluid to and from said actuator, said four-way control valve having an inlet and an exhaust outlet and being operative to alternatively connect said inlet and said exhaust outlet to respective opposite sides of said piston;
and wherein said shut-off valve is a two-way valve operative to alternatively connect said inlet of said actuator control valve to said source of said control fluid or to an exhaust receptacle.

* * * * *